United States Patent [19]
Hayes et al.

[11] 3,878,232

[45] Apr. 15, 1975

[54] EXTRACTION PROCESS TO IMPROVE THE QUALITY AND YIELD OF CRUDE VEGETABLE OILS

[75] Inventors: Lester P. Hayes; Ross P. Simms, both of Decatur, Ill.

[73] Assignee: A. E. Staley Manufacturing Company, Decatur, Ill.

[22] Filed: May 21, 1973

[21] Appl. No.: 361,918

Related U.S. Application Data

[63] Continuation-in-part of Ser. No. 75,933, Sept. 28, 1970, Pat. No. 3,734,901.

[52] U.S. Cl. ............................... 260/412.4; 260/403
[51] Int. Cl. ............................ C09f 5/02; C11b 1/00
[58] Field of Search ......................... 260/412.4, 403

[56] References Cited
UNITED STATES PATENTS

| | | | |
|---|---|---|---|
| 2,384,388 | 9/1945 | Monte et al. | 260/412.4 |
| 2,595,825 | 5/1952 | Williamson | 260/412.4 |
| 3,012,888 | 12/1961 | Davis et al. | 99/15 |
| 3,734,901 | 5/1973 | Hayes et al. | 260/123.5 |

*Primary Examiner*—Elbert L. Roberts
*Attorney, Agent, or Firm*—Charles J. Meyerson; M. Paul Hendrickson

[57] ABSTRACT

Soybean solids and lecithin oils essentially free from objectionable flavors and odors are obtained by initially extracting undesirable lipid components from oil containing seed materials. These undesirable lipids can be extracted with an azeotropic mixture of hexane and alcohol. A debittered, high lecithin-containiing oil is obtained by admixing the resultant lipid extract with aqueous alcohol and then effectuating an oil phase separation therefrom. The oil, essentially free from the undesirable lipid contaminants, is recovered from the hexane-oil phase.

15 Claims, No Drawings

EXTRACTION PROCESS TO IMPROVE THE QUALITY AND YIELD OF CRUDE VEGETABLE OILS

This application is a continuation-in-part of copending application Ser. No. 75,933 filed Sept. 28, 1970 now U.S. Pat. No. 3,734,901, by Lester P. Hayes et al. and entitled "Defatted Soybean Fractionation by Solvent Extraction".

The invention relates to the processing of seeds and the recovery of unique products therefrom. More particularly, the invention relates to a process for obtaining high quality seed oils.

BACKGROUND OF THE INVENTION

The lipid constituents of soybean seeds are conventionally defined as a composite of lipid materials extractable from ground or flake soybeans with organic solvents such as petroleum naphthas, diethylether, hexane, the chlorinated hydrocarbons etc. Broadly, the amount of lipid material in dehulled soybean seeds ranges from about 15% to about 30% of its total dry weight with most commercially available lots ranging from about 22% to about 24% by weight lipid material. About 90% to 95% of the total lipid extractable constituents of dehulled soybean seeds is fatty acid glycerides. Hydrocarbon solvents such as hexane readily extract these fatty acid glyceride constituents. The remaining minor lipid components are comprised of saponifiable and unsaponifiable constituents. The saponifiable components consist essentially of phosphatides and free fatty acids which respectively comprise about 0.25 to about 1.0% and about 0.1 to about 0.5 weight percent of the total dehulled soybean solid weight. The unsaponifiable fractions of the lipids contained in soya beans represents a small proportion of the total lipids and comprises a diversity of components such as oil-soluble pigments, vitamins, sterols and tocopherols. This unsaponifiable fraction includes as a class the hydrocarbons, aliphatic and cyclic alcohols, phenols, ketones and relatively unsaponifiable constituents such as waxes, phytosterolins, vitamin esters, etc.

It is conventional to prepare soybean meals by extracting oil from soybean particulates (e.g., flakes or granules) with hydrocarbon solvents such as hexane. The extraction process recovers approximately 90% to 95% of the total soybean oil content. These defatted soybean meals contain approximately 0.5% to about 5.0% residual lipids as ascertained by AOCS Official Method AC 3-44, Official Method of American Oil Chemists Society. These residual lipids are primarily composed of the fatty constituents of a high lecithin soybean oil.

An analytical method for removing (via hexane and alcohol extraction) and identifying phosphatides from soybeans has been disclosed by Neilsen, Kaj, in a publication entitled "The Composition of the Difficultly Extractable Soybean Phosphatides", *Journal of the American Oil Chemists Society*, 37, 217–19, 1960.

The art has been consistently plagued with the problem of producing food grade products from vegetable seed materials which are essentially free from adverse flavor and odorous contaminants. Recovery of bland lipids and non-lipid vegetable seed components, without substantially altering the native characteristics of the seed, by an efficient process would significantly enhance the commercial value of the vegetable seed components as a food commodity. Numerous processes to reduce the beany, bitter principles from the non-lipid, vegetable seed components have been proposed. Likewise, a host of processes especially adapted to improve the flavor characteristics of the lipids have also been proposed. The most significant advances in alleviating this problem are rather complex and ineffective processing techniques which substantially alter the character of the native vegetable seed components. The causitive factors and the means whereby these undesirable contaminants can be eliminated without excessively degrading the native lipid and non-lipid seed components remains unsolved.

OBJECTS

An object of the present invention is to provide a process for obtaining a high-grade seed oil from oil seed material.

Another object of the invention is to provide an efficient and economical process for removing adverse contaminants from extracted oils.

A still further object of the invention is to increase the amount of recoverable lecithin.

DISCLOSURE OF THE INVENTION

According to the present invention there is provided a process for recovering from vegetable seed materials a lecithin rick oil essentially free from adverse flavor and odor components, said process comprising the steps of:

A. extracting lipid constituents from vegetable seed material by subjecting the seed material to a lipid extraction medium containing a hydrocarbon solvent and from about 2 to 30 parts by weight monohydric alcohol for each 80 parts by weight hydrocarbon solvent, said extraction of lipids being conducted under conditions whereby the amount of alcohol is maintained at a level of at least 2% to about 40% by weight of the vegetable seed material dry weight, and the amount of lipid constituents extracted from the seed material is at least equal to the AC 3-44 lipid content of the vegetable seed material prior to the extraction of the lipids therefrom;

B. separating the resultant lipid miscella from the vegetable seed material;

C. mixing the extracted lipids in the presence of a hydrocarbon solvent, water and alcohol to provide an admixture thereof, said admixture containing a sufficient amount of monohydric alcohol and water to provide a polar phase containing on a total weight basis from about 40% to about 70% by weight monohydric alcohol;

D. allowing the admixture to separate into a non-polar phase containing lipid extract and a polar phase containing water-soluble extract;

E. partitioning the polar phase from the non-polar phase; and

F. recovering a lipid concentrate from the non-polar phase.

Vegetable seed materials containing extractable lipid constituents are suitable starting materials in practicing the present process. Illustrative seed materials containing extractable lipids are cottonseed, safflower and sunflower seeds, peanuts, sesame seeds, soybeans and the like. The lipid content of such seed materials usually ranges from about 0.5% to about 30% by weight lipids (AOCS — AC 3-44 Analysis). Full fat seed material (i.e., seed materials containing the indigineous oil) generally contain from about 15 to about 30% by weight lipids whereas partially defatted seed material (e.g., oil extracted seed material) will usually contain less than 10% by weight lipids.

Pursuant to the invention, the residual lipids are extracted from seed materials with a hydrocarbon/monohydric alcohol extraction medium. To facilitate the extraction of lipids therefrom, it is conventional to increase the extraction surface by providing the lipid containing seed material in the flake or granular form. The lipid extraction medium for full fat or solvent extracted seed materials is comprised of a hydrocarbon solvent and at least 2 parts by weight to about 30 parts by weight of a monohydric alcohol for each 80 parts by weight of the hydrocarbon solvent. The total amount of lipid extraction medium necessary in extracting the residual lipids depends primarily upon the soya composition solids weight and the monohydric alcohol concentration. The total amount of monohydric alcohol should be at least 2% to about 40% alcohol of the total soya compositions solids weight. Enhanced extraction rates and the ability to remove significantly greater concentrations of the residual lipid material contained within the soybean composition is accomplished when the amount of monohydric alcohol employed ranges from about 8 to 25 parts by weight monohydric alcohol for each 80 parts by weight hydrocarbon solvent with the amount of alcohol ranging from 5% to 25% of the soya composition solids weight. The solvent to soybean flakes weight ratio under such conditions will normally range from about 0.85:1 and 1.35:1. Significantly greater rates of extraction and effectiveness in removing the lipids is accomplished when in the lipid extraction medium solvent the amount of monohydric alcohol ranges from about 10% to 20% of the soya composition solids weight (usually at an extraction solvent: composition weight ratio of about 1:1 to about 4:3).

Illustrative monohydric alcohols employed herein include aliphatic monohydric alcohols of from 1 to 4 carbon atoms such as methanol, ethanol, isopropanol, n-propanol, and butanol, isobutanol, n-butanol and mixtures thereof. When ethanol is employed as a monohydric alcohol, significantly greater recovery of residual lipids from the soybean flakes, increased effectiveness in the removing residual lipids therefrom coupled with improved processed products are accomplished. Hydrocarbon solvents include those utilized in defatting soybean flakes such as hexane, n-heptane, napthas consisting essentially of relatively pure paraffins of very narrow boiling range, the heptane-type napthas, mixtures thereof and the like. Normal hexane in the combination with ethanol is particularly suitable as a solvent for the extraction of the residual lipids from the soya composition.

Illustrative defatted soybean flakes include those obtained from commercial petroleum solvent extraction processes. These defatted soybean flakes contain residual lipids and substantially all of the water-soluble constituents, fibrous and proteinaceous material of the native soybean seed. The residual lipids of the defatted soya compositions range from at least 0.5% to about 10% of its total solids weight as ascertained by AOCS — Official Method AC 3-44 with a residual lipid content of about 0.5% to about 1.5% being most common. The residual lipids consist primarily of fatty acid glycerides along with minor components of both saponifiable and unsaponifiable lipids. The phosphatides comprise approximately 30 to 80 weight percent of the total residual lipids. As evident from the above, full fat flakes also contain the residual lipid constituents as well as lipids which are readily extractable with a hydrocarbon solvent such as hexane. Accordingly, the extraction of full fat flakes with the hydrocarbon/monohydric alcohol lipid extraction medium herein results in a lipid miscella which contains the hydrocarbon extractable lipid constituents as well as the residual lipid constituents.

Since the extraction of the residual lipids from the defatted soya compositions necessitates a hydrocarbon-alcohol solvent extraction step, it is advantageous to utilize a hydrocarbon-saturated soya composition.

In a commercial process, a soya composition saturated with hydrocarbon (preferably hexane) can be directly obtained after the conventional solvent-extraction process by omitting or at least, not completing desolventizing. In the residual lipid extraction step, defatted soybean flakes having a hydrocarbon solvent to solid full fat soybean flake weight ratio of about 1:1 to about 1:3 are advantageously employed. Since the present invention is most suitably employed in conjunction with a conventional hydrocarbon solvent extraction process, unless expressly stated otherwise, all solids weights in the residual lipid and aqueous soluble extraction steps are based upon the solid weight of dehulled soya compositions prior to removal of lipids or oils therefrom (e.g., full fat soybean flake weight). When defatted soybean flakes saturated with a hydrocarbon are employed, the total amount of hydrocarbon solvent required in the lipid extracting step is proportionally reduced to compensate for that already provided by the saturated soybean flakes.

If soy compositions saturated with a hydrocarbon solvent are employed, significantly improved extraction rates and more efficient solvent use are achieved by initially treating the soya composition with either a relatively pure monohydric alcohol or a lipid extracting medium wherein at least a major portion of the medium (on a weight basis) is a monohydric alcohol. Such an initial pretreatment of the hydrocarbon saturated soya composition with a monohydric alcohol results in a penetration and removal of the hydrocarbon from the interstices of the soya composition or flakes. The initial pretreatment enables the monohydric alcohol to function as a wetting agent, thus facilitating the removal of residual lipids therefrom. If the solventized flakes are pretreated with monohydric alcohol, the total amount of monohydric alcohol in the lipid extraction medium is accordingly adjusted to provide the appropriate balance of soybean flake, hydrocarbon and monohydric alcohol in the lipid extraction medium.

The residual lipid extraction step is conducted at any temperature between the freezing and boiling points of the solvent mixture (i.e., under conditions wherein solvent is liquid). In order to maximize the rate of extraction, reduce equipment and processing costs and increase the lipid yields, elevated temperatures are generally employed. Advantageously the temperature of the residual lipid extraction medium ranges from about 100°F. to the boiling point of the solvent mixture. In extracting the residual lipids, the preferred temperature is about the reflux temperature of the lipid extraction medium (e.g., normally 100°F. to about 140°F.).

In the extraction of the residual lipid materials from flaked soybean compositions, the monohydric alcohol does not function solely as a co-solvent. The monohydric alcohol expedites the release of lipids from the protein-carbohydrate complex. This co-action enables the hexane to more effectively solubilize the residual lipids. Thus, the monohydric alcohol promotes and enhances the solvent properties of the hydrocarbon. If the concentration of monohydric alcohol in the solvent mixture is too great (e.g., greater than 70%), a substantial amount of non-proteinaceous matter including a significant portion of the water-soluble constituents (e.g., the sugars) will be extracted during the residual lipid extraction step. When the solvent concentration of the alcohol is too dilute (e.g., less than 10%), the effectiveness of the lipid extracting medium is substantially reduced (e.g., protein is extracted and the solubilized flakes absorb an excess amount of the extraction medium).

Full fat and defatted soybean flakes normally contain water. An excessive amount of water in the residual lipid extraction step should be avoided. Too much water results in a monohydric alcohol-water solvent system that solubilizes the water-soluble constituents and contaminates the extracted lipids therewith. Thus, when a relatively large amount of water is present in the lipid extracting medium, the monohydric alcohol and water functions as miscible co-solvents. For these reasons, the monohydric alcohol to water weight ratio during the residual lipid extraction step should be no less than 2:1. This problem is advantageously obviated by employing defatted soybean flakes containing no more than 15% by weight moisture. Improved results are achieved when the total amount of water present in the extraction medium is maintained from about 5% to about 15% by weight of the lipid extraction medium weight.

The lipid extraction step can be accomplished employing conventional extraction processing techniques and apparatus (e.g., batch or continuous co-current or counter-current extraction systems). The lipid extraction medium containing the lipid extracts (i.e., lipid miscella) can be separated from the resultant soya composition by conventional means (e.g., draining, decantation, centrifugation, distillation, air or vacuum drying, etc.). Illustrative suitable apparatus for the lipid extraction step include batch-type extractors, basket-type extractors (e.g., a "Bollman" extractor), vertical U-type extractors, inclined screw conveyor type of extractors, drag chain extractors and the like.

The total lipid content of defatted soya composition cannot be accurately ascertained by the industry adopted standard exhaustive hexane extraction test, AOCS, Method AC 3-44. Pursuant to such an assay, most conventional defatted soybean flakes normally indicate a residual lipid content of about 0.5 to about 1.5% by weight. However in practicing the invention, recoverable residual lipid yields of about 2 to 3% from defatted soybean flakes are commonly experienced notwithstanding a prior exhaustive hexane extraction assay of about 0.5% lipids. A subsequent assay of the resultant flakes after such an extraction of residual lipids will still indicate a residual lipid content of about 0.5% of its total weight. It has been experienced that residual lipids well in excess of 0.5% are recoverable by subsequent extraction thereof with the hexane/monohydric alcohol medium (frequent yields in excess of 1.0% even though the assay indicates a residual lipid content of only about 0.5% by weight).

From the aforementioned, it is apparent that the total residual lipid content of defatted soya compositions is considerably higher than ascertained by conventional extractive hexane solvent exhaustive analytical tests. From assay tests of defatted soybean flakes submitted to the lipid extraction medium employed in the present invention, the residual lipids still remaining in the flakes are apparently properly conditioned to permit a more effective removal therefrom by the hexane employed in the exhaustive extractive test. Although it is possible to employ more than one lipid extraction step in the present process, it has been found that the initial lipid extraction step effectively removes the beany constituents of the defatted flakes while still enhancing both the processing and the properties of the resultant recoverable soya compositions therefrom.

In practicing the residual lipid extraction step of the present invention, the residual lipid extraction step should be conducted under appropriate processing conditions such that the amount of recovered lipids is at least equal (on a weight basis) to the total lipid content as assayed by the standard exhaustive hexane extraction test of the soya composition. If hydrocarbon extracted soybean flakes (i.e., defatted) are used, improved overall processing efficiency as well as increased yields of residual lipids, water-soluble constituents, and protein concentrates are accomplished when at least a two-fold recovery (i.e., based on the apparent assay per the standard exhaustive hexane-solvent extraction test) of the residual lipids are extracted from the vegetable seed material. The characteristics of the recoverable residual lipids and protein concentrates along with improved processing efficiency and yields are effectuated when the total amount of residual lipids extracted from defatted seed materials ranges from about 3 to about 6 times the apparent residual lipid content of the initial soya composition as ascertained by the standard exhaustive hexane-solvent extraction test.

After removing the residual lipids from the seed material, the water-soluble constituents are more easily extracted therefrom in comparison to defatted seed materials which contain substantially all of the residual lipids therein. The removal of residual lipids from the vegetable seed material is an important process step because it properly conditions the soya composition so that the water-soluble constituents can be effectively removed therefrom. It has been found that the residual lipids function as if they were a water impenetrable barrier. Polar solvents such as aqueous mediums cannot readily penetrate this barrier and solubilize these water-soluble constituents. Similarly a hydrocarbon solvent by itself cannot effectively remove the residual lipids. However, the monohydric alcohol and hydrocarbon lipid extracting medium employed herein is highly effective in removing the residual lipids. The processing details for extracting these water-soluble constituents with aqueous alcohol and utilizing the resultant aqueous miscella in combination with the lipid miscella is disclosed in co-pending parent application Ser. No. 75,933, now U.S. Pat. 3,734,901. The residual extracted solids are characterized as a bland, soybean concentrate. As indicated in the co-pending parent application, the water-soluble aqueous-alcohol extractable constituents are extracted with a solvent medium containing between 40 to 70% by weight monohydric alcohol. Upon completion of the aqueous-alcohol extraction step, the resultant aqueous-miscella can be admixed with the lipid miscella and a phase separation is effected to provide a non-polar phase containing the lipid extract and a polar phase containing the water-soluble extracts. The admixture thereof contains a sufficient amount of water and alcohol to yield a polar phase containing on a total weight basis about 40% to about 70% by weight monohydric solvent. The non-polar phase is then partitioned from the polar phase. A lipid concentrate can then be conveniently recovered from the non-polar phase. In this process, the aqueous-alcohol phase extracts the bitter and objectionable malodorous and flavor components from the lipid miscella.

In order to effectively separate and remove a high grade lecithin from the resultant admixture, it is essential that the monohydric alcohol be greater than 40% and less than 70% of the admixture polar phase weight. When the monohydric alcohol concentration is less than 40%, the resultant admixture will form an emulsion instead of separating into distinct and separable phases. If the concentration of monohydric alcohol is in excess of 70%, the soybean oil lecithin and monohydric alcohol will not fractionate properly with substantial amounts of lecithin and monohydric alcohol resulting in both the polar and non-polar phases. Greater effectiveness in accomplishing the two-phase separation as well as effectuating a more complete separation of the lipid and water-soluble residual constituents of the soya compositions is accomplished when the proportion of alcohol provided in the mixed phases ranges from 45% to 65% by weight of the polar phase with 50% being preferred. If the total amount of combined alcohol from the lipid miscella and aqueous miscella is outside this range, the appropriate alcohol content should be adjusted prior to admixing.

After thoroughly admixing, a two-phase separation of the resultant admixture can be achieved by gravitation (e.g., batch or continuous separation by centrifugation or merely allowing it to remain in a quiescent state with decantation). Under gravitational conditions, the entire admixture separates into two phases. The upper non-polar phase consists essentially of the components of a high lecithin-containing oil and hexane. The aqueous or polar phase contains substantially all of the soybean lipid extracts which are soluble in the water-monohydric alcohol solvent system. The monohydric alcohol migrates to the aqueous phase. The residual lipid extracts, which are responsible for a harsh, "beany" flavor, will also be carried along with the alcohol into the aqueous phase. Lecithin and the triglycerides are extracted from the admixture and carried into the non-polar phase by the hydrocarbon solvent.

The polar phase and non-polar phase are suitably separated from one another by conventional means such as a solvent decanter tank, a batch or continuous centrifuge, etc. If the non-polar phase contains a substantial amount of fatty residues, these residues can be removed effectively by effectuating another polar and non-polar phase separation employing a monohydric alcohol/water extraction medium substantially free from water solubles. When the non-polar phase has been purified to the desired extent, the residual high-lecithin oil is recovered by conventional means (e.g., desolventized by distillation). The recovered non-polar solvent is recycled for use whenever required (e.g., as solvent in defatting full-fat soybean flakes or added to the lipid extraction medium to remove residual lipids from the defatted flakes). The soybean water-solubles contained in the polar phase are concentrated and recovered in a useful form with the recovered alcohol and/or water being recycled to the process whenever needed.

The lipid miscella contains residual lipids, the hydrocarbon extractable lipid constituents, hexane, alcohol and a small amount of water. As mentioned herein, the undesirable lipid constituents are removed from the crude lipid extracts by admixing the crude lipid extract in the presence of a hydrocarbon solvent, water and alcohol whereupon the admixture is permitted to separate into a non-polar phase (i.e., the hydrocarbon solvent and crude, hydrocarbon-soluble lipid extracts) and a polar phase (i.e., water-alcohol phase and the undesirable oil contaminants). The admixing and phase separation is conducted such that the total alcohol concentration of the polar phase (based upon the total water-alcohol weight) is between about 40% to about 70%. Within this aqueous alcohol concentration range, phase separation and contaminant leeching will occur even though a small amount of polar solvent is utilized. Since the water and alcohol will migrate to the polar phase, the alcohol and water initially in the lipid miscella becomes a part of the polar phase. If the lipid miscella contains a relatively high concentration of alcohol, the appropriate alcohol concentration may be adjusted by the admixing therewith additional water without added alcohol. The non-polar phase and polar phase ratios effectuated by this process will depend largely upon the effectiveness of the process actually employed and the desired amount of contaminant to be removed therefrom. The lipid contaminants in the crude lipid extract may be removed incrementally or in a single stage. It has been found that processing conditions which provide a total or cumulative polar phase to non-polar phase volume ratio of more than 3:7 results in a lipid material which is substantially free from undesirable flavor and odorous components.

Increased polar solvent usage further increases the effectiveness of the contaminant removal therefrom. Although a polar solvent to non-polar solvent volume ratio of greater than 1:1 can be used to effectively extract the contaminants from the crude lipid material, there are no definite advantages in using a greater amount of polar solvent.

The examples following are merely illustrative and should not be construed to limiting the scope of the invention.

EXAMPLE I

Employing a six-stage countercurrent treatment, a bland, soya protein concentrate having a protein content of 74% by dry solids weight was prepared. The first three countercurrent stages were employed to extract residual lipids from "defatted" soybean flakes saturated with hexane. The latter three stages were utilized to extract the water-soluble constituents. To the first countercurrent stage, there was admitted soybean flakes saturated with hexane wherein excess hexane solvent employed in a conventional solvent extraction process had been drained from the flakes. The drained soybean flakes saturated with hexane contained 56% by weight dry solids, 8.5% by weight water and 32.5% by weight hexane. On a dry solids weight basis, the soybean flakes were comprised of about 0.6% residual lipids and 57% protein.

The three countercurrent equilibrated slurries of stages 1, 2 and 3 were maintained at 120°F. with a total residual lipid extraction solvent medium to dry solids weight ratio at about 5:1 (i.e., about 4:1 on full fat flake weight). Including the hexane and water from the saturated flakes plus additional water of the 180 proof ethanol employed, each of the first three equilibrated countercurrent stages had a residual lipid solvent extraction medium comprised on a weight basis of about 64% hexane, 26% ethanol and 10% water. The first three stages were slurried for about 20 minutes with the resultant equilibrated flakes from stages 1 and 2 being separated from the residual lipid extraction solvent by means of perforated basket centrifuge operated at 2,000 G's. A portion of the full miscella containing the extracted residual lipids was recovered from the first stage and placed in decanter flasks for further processing with the aqueous miscella from stage 4.

The intermediate miscella obtained from the second and third stages were forwarded and recycled for use as a residual lipid extraction solvent in the first and second stages and to maintain an appropriate solvent level for each stage. The centrifuged cakes from stages 1 and 2 were transferred respectively to equilibrated stages 2 and 3. The net solvent usage in extracting the residual lipids was 1.8 parts by weight of residual lipid extraction solvent for each part by weight of dry solids admitted to the first stage. Thus, for each part by weight of dry solids admitted to the first stage, 1.8 parts by weight of fresh solvent comprised (on a weight basis) of a 64% hexane, 26% ethanol and 10% water was introduced to the third stage.

After submitting the soya composition to the third stage and completion of the equilibration thereof, excess lipid solvent extraction medium was drained from the resultant solid soya composition. The resultant drained soya material (approximately comprised on a total weight basis of 50% dry solids, 27% hexane, 14% ethanol and 9% water) was then subjected to a desolventization process whereby all of the hexane was removed. The resultant desolventized soya material, free of hexane removed, contained approximately on a total weight basis, 74% dry solids, 16% ethanol and 10% water. The water soluble constituents were removed by forwarding the soya composition (free of hexane) to the next three equilibrated countercurrent aqueous ethanol extraction stages. Each slurry stage was maintained at about 6.75 parts by weight solvent for each part by weight dry solids and at a temperature of 120°F. After 20 minutes of slurrying for each stage, the equilibrated soya compositions were separated by means of a perforated basket type centrifuge operated at 2,000 G's. A portion of the full aqueous ethanol miscella from the fourth equilibrated stage was recovered for processing with the residual lipid miscella from stage 1. As in the above residual lipid extraction stages, the intermediate miscella from stages 5 and 6 were forwarded and recycled for use in stages 4 and 5 and to maintain the appropriate solvent level for each stage. Recovered centrifuged cakes from stages 4 and 5 were respectively forwarded to stages 5 and 6. Fresh solvent having a 1:1 weight ratio of ethanol and alcohol was introduced into the sixth stage at a rate of about 2.7 parts by weight fresh solvent for each part by weight of dry solids admitted to the first stage.

The centrifuged cake recovered from the sixth stage was comprised (on a weight basis) of 40% dry solids, 30% ethanol and 30% water. The water and ethanol was removed from the centrifuged cake by steam stripping. The resultant desolventized product was ground into a meal. Its assay was 91% by weight dry solids of which 74% by weight was protein.

About 6.2 parts by weight of the full residual lipid miscella recovered from stage 1 containing on a weight basis of 2.75% dry solids, 70.50% hexane, 23.25% ethanol and 3.50% water was combined with 4.1 parts by weight of the full aqueous ethanol miscella from stage 4. The full aqueous ethanol miscella from stage 4 was comprised on a total weight basis of about 46% ethanol, 43% water and 11% dry solids. The combined full residual lipid miscella and aqueous ethanol miscella were then vigorously agitated together to provide a homogeneous admixture. The resultant admixture was then allowed to stand for five minutes in a decantor flask whereupon the admixture separated into two distinct phases. The upper non-polar phase was separated and upon analysis found to be comprised on a total weight basis of about 93% hexane, 2.85% lipids, 2.42% ethanol and 1.73% water. An oil of a high lecithin content, 40% acetone insoluble, was recovered by evaporation steam stripping. Based upon the total amount of dry solids submitted in the first stage, the recovered oil represents 2.6% of its weight.

The dry solids were recovered from the lower polar phase by evaporating off the excess solvent. Recovered solids represented 13.6% by weight of the total dry weight of soybean flakes submitted to the first stage with the recovered solids being primarily comprised of sugars.

EXAMPLE II

Six equilibrated countercurrent slurry extraction stages were utilized to prepare a bland soya protein concentrate and a crude oil extract. The first three countercurrent stages extracted the crude lipids (including residual lipids) from full fat soybean flakes. The full fat flakes (2235 g) contained 10.5% moisture and 19.3% oil (AOCS Method AC 3-44). The next three stages were utilized to extract the water soluble constituents from the defatted flakes.

The first three stages (lipid extraction) were maintained at 115°F. The equilibrated solvent to flake ratio in each slurry stage was maintained at about 4:1 (full fat dry weight basis). As the flakes passed from one stage to the next in the first three stages, they were separated from the equilibrated solvent by centrifuging in a perforated basket at 2000 G's. The defatted flakes obtained from the third stage were flushed in the centrifuge and the 2600 gms. of fresh solvent (2080 grams hexane and 520 grams ethanol) were then added to stage three.

The resultant lipid miscella (2296 grams, with analysis of 20.5% dissolved lipids, 15% alcohol and 64% hexane) was removed from the equilibrated first stage. Analysis of the extracted flushed flakes from stage three indicated 65% dry substance with 75% entrained hexane, 19% alcohol and 6.2% water as extracted solvent. The total solvent used to complete the lipid extraction was 1.3 parts by weight for each part by weight of the fresh full fat flakes (dry substance weight).

To remove the hexane, the defatted flakes were partially desolventized. The partially desolventized flakes were then extracted in three equilibrated countercurrent stages using a total of 2.7 parts of 50% aqueous ethanol. The flakes were separated from the equilibrated solvent in each stage in a perforated centrifuge bowl (12 inch). The aqueous alcohol extracted flakes were recovered from stage six and contained 40% dry substance, 30% ethanol and 30% water. On a dry substance basis, the extracted flakes were 74% protein. The full aqueous ethanol miscella from stage 4 was comprised on a total weight basis of about 43.5% ethanol, 43.5% water and 13% dry solids.

About 2296 grams of the full lipid miscella recovered from stage 1 (containing on a weight basis 20.5% dry substance, 64% hexane, 15% ethanol and 0.5% water) was combined with 2587 grams by weight of the full aqueous ethanol miscella from stage 4. The combined full residual lipid miscella and aqueous ethanol miscella were then vigorously agitated together to provide a homogeneous admixture. The resultant admixture was then allowed to stand for 5 minutes in a decanter flask whereupon the admixture separated into two distinct phases. The upper, non-polar phase was separated and upon analysis found to be comprised on a total weight basis of about 71.5% hexane, 25% lipids (0.20% phosphorus), 2% ethanol and 1.5% water. An oil of a high lecithin content was recovered from the non-polar phase by evaporative steam stripping.

The total crude lipid extract was 23.5% of the starting full fat flake dry substance weight. Based upon the total weight of dry solids submitted in the first stage, the recovered oil from the non-polar phase represents about 22.5%. This 1% reduction from the crude lipid dry substance represents the removal of a bitter carbohydrate fraction from the admixture via the aqueous alcohol phase. The resultant recovered oil was characterized as being essentially free from adverse flavors.

EXAMPLE III

A crude lipid miscella was obtained from the first stage of six equilibrated countercurrent extraction stage process of Example 2. This crude miscella on a weight basis contained 20.5% dry substance (extractable lipids including the residual lipid extracts), 64% hexane, 15% ethanol and 0.5% water.

Instead of utilizing the aqueous alcohol miscella of Example 2, 344 grams of water was added to 2296 grams of the crude lipid miscella to adjust the net polar solvent weight to about 700 grams (inclusive of the amount of water and alcohol provided by the crude lipid miscella).

The crude lipid miscella and added water was vigorously agitated and the polar and non-polar phase were permitted to separate as in Example 2. The polar phase (about 708 grams) was partitioned from the non-polar phase. A solid polar phase residue (19.6 grams d.s.) was obtained by evaporation. This polar phase residue possessed a very bitter, undesirable flavor.

An oil of a high lecithin content was recovered in accordance with Example 2. This oil was essentially free from undesirable flavors and odors. Without adding additional water, forming an admixture and the separation therefrom of a polar and non-polar phase, a crude oil was recovered. This recovered crude oil possessed a bitter and undesirable flavor.

Since many embodiments may be made of this invention and since many changes may be made in the embodiments described, the foregoing is to be interpreted as illustrative only and the invention is defined by the claims appended hereafter.

What is claimed is:

1. A process for recovering a lecithin rich oil from vegetable seed material which contains lipids and substantially all of the water soluble constituents of the native seed material, said process comprising the steps of:
   A. extracting lipid constituents from vegetable seed material by subjecting the seed material to a lipid extraction medium containing a hydrocarbon solvent and from about 2 to about 30 parts by weight monohydric alcohol for each 80 parts by weight hydrocarbon solvent, said extraction of lipids being conducted under conditions whereby the amount of alcohol is maintained at a level of at least 2% to about 40% by weight of the vegetable seed material dry weight and the amount of lipid constituents extracted from the seed material is at least equal to the AC 3-44 lipid content of the vegetable seed material prior to the extraction of the lipids therefrom;
   B. separating the resultant lipid miscella from the vegetable seed material;
   C. mixing the separated lipids of step (B) in the presence of a hydrocarbon solvent, water and alcohol to provide an admixture thereof, said admixture containing a sufficient amount of monohydric alcohol and water to provide a polar phase containing on a total weighr basis from about 40% to about 70% by weight monohydric alcohol;
   D. allowing the admixture to separate into a non-polar phase containing lipid extract and a polar phase containing water-soluble extract;
   E. partitioning the polar phase from the non-polar phase; and
   F. recovering a lipid concentrate from the non-polar phase.

2. The process according to claim 1 wherein the vegetable seed material has a lipid content ranging from about 10% to about 30% by weight.

3. The process according to claim 2 wherein after extracting the residual lipids from the vegetable seed, at least a major portion of water-soluble constituents of the vegetable seed material are extracted therefrom with an aqueous extraction medium containing from about 40% to about 70% by weight of an aliphatic alcohol to provide an aqueous miscella thereof and the aqueous miscella is thereafter admixed with the lipid miscella to provide an admixture thereof.

4. The process according to claim 3 wherein the hydrocarbon solvent consists essentially of hexane, the monohydric alcohol consists essentially of ethanol and the vegetable seed material consists essentially of soybean flakes having from about 20% to about 25% by weight lipid.

5. The process according to claim 2 wherein the residual lipid extraction medium is comprised of about 8 to about 25 parts by weight monohydric alcohol and 80 parts by weight hydrocarbon with the extraction of residual lipids being conducted under conditions whereby the monohydric alcohol concentration is maintained at a level of at least 5% to about 25% of the total dry weight of the seed material submitted to the lipid extraction medium.

6. The process according to claim 5 wherein the polar solvent portion of the admixture consists essentially of water and a lower aliphatic alcohol with the alcohol comprising from about 45% to 65% of the total polar solvent weight.

7. The process according to claim 6 wherein the vegetable seed material consists essentially of soybean flakes having a lipid content ranging from about 20% to about 25% by weight.

8. The process according to claim 7 wherein the nonpolar hydrocarbon solvent consists essentially of hexane and the monohydric alcohol consists essentially of ethanol.

9. The process according to claim 1 wherein at least a major portion of the total lipid content of the vegetable seed material has been extracted therefrom prior to the extraction of the residual lipids therefrom.

10. The process according to claim 9 wherein the vegetable seed material consists essentially of defatted soybean flakes.

11. The process according to claim 10 wherein the residual lipid extraction medium is comprised of about 8 to about 25 parts by weight ethanol and 80 parts by weight hexane with the extraction of residual lipids being conducted under conditions whereby the ethanol concentration is maintained at a level of at least 5 to about 25 of the total dry weight of the seed material submitted to the lipid extraction medium.

12. The process according to claim 5 wherein the polar solvent phase of the admixture consists essentially of water and a lower aliphatic alcohol with the alcohol comprising from about 45% to about 65% of the total polar solvent weight.

13. The process according to claim 12 wherein the polar phase is substantially free from water-soluble seed material constituents and the monohydric alcohol consists essentially of ethanol.

14. The lipid concentrate prepared in accordance with the process of claim 1.

15. A lecithin rich oil concentrate prepared in accordance with claim 1 wherein the vegetable seed material consists essentially of soybean flakes.

* * * * *

UNITED STATES PATENT OFFICE
CERTIFICATE OF CORRECTION

PATENT NO. : 3,878,232
DATED : April 15, 1975
INVENTOR(S) : Lester P. Hayes and Ross P. Simms It is certified that error appears in the above-identified patent and that said Letters Patent are hereby corrected as shown below:

Abstract, line 6; for "containiing" read ---containing---
Column 2, line 28; for "rick" reach ---rich---
Column 9, lines 36/37; for "excess lipid" read ---excess residual lipid---

Signed and Sealed this twenty-sixth Day of August 1975

[SEAL]

Attest:

RUTH C. MASON
Attesting Officer

C. MARSHALL DANN
Commissioner of Patents and Trademarks